Feb. 3, 1931. H. B. SABIN 1,790,949
TIRE INSPECTION MACHINE
Filed Feb. 18, 1928
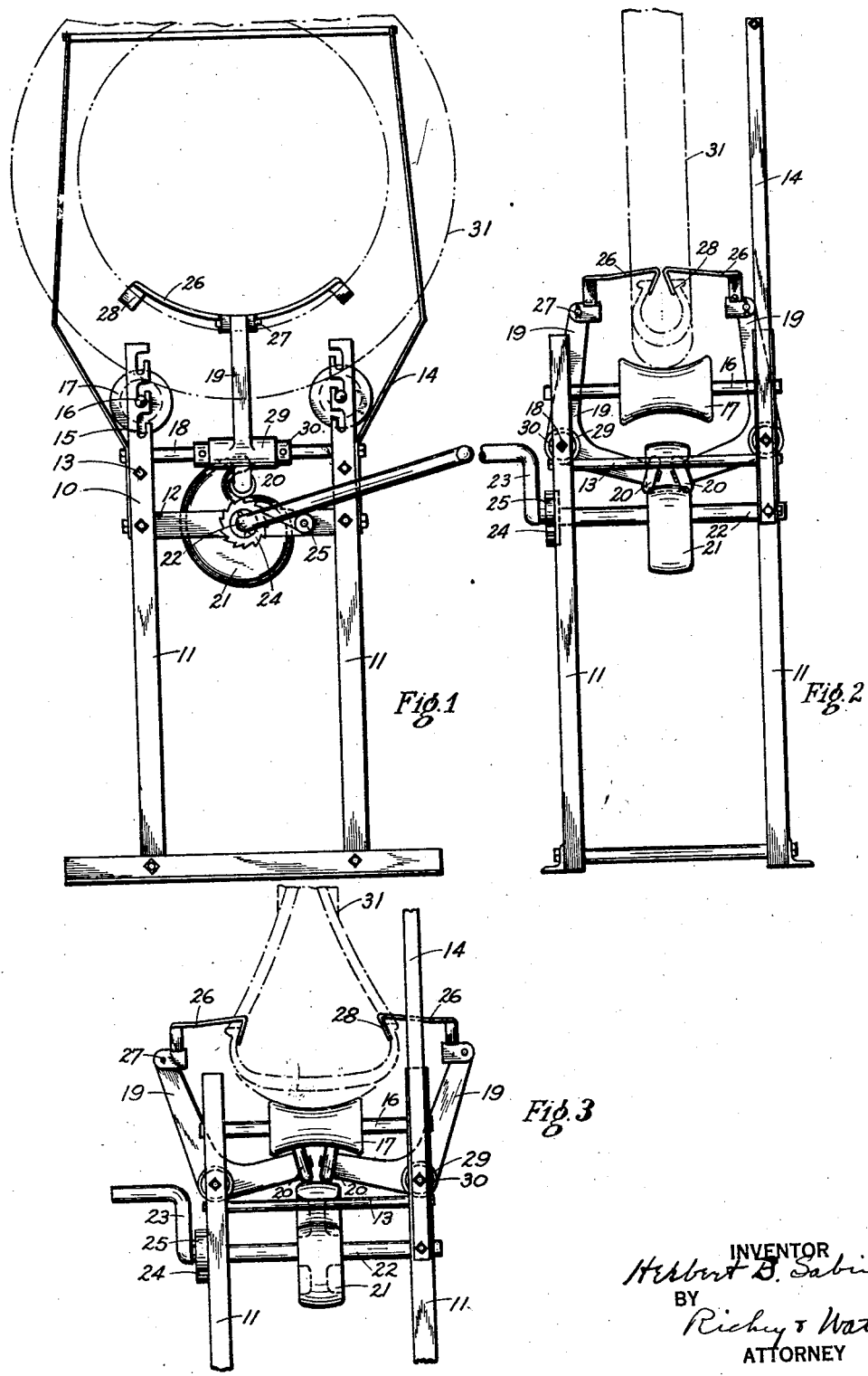

Patented Feb. 3, 1931

1,790,949

UNITED STATES PATENT OFFICE

HERBERT B. SABIN, OF CLEVELAND, OHIO

TIRE-INSPECTION MACHINE

Application filed February 18, 1928. Serial No. 255,261.

This invention relates broadly to appliances for separating the beaded edges of pneumatic tire casings and more specifically to an improved and more comprehensive organization of mechanisms for actuating and controlling the spreader elements therefor.

One of the objects of this invention is to construct a tire inspection appliance in which the spreader elements, under the effectual operation of the controlling mechanism are sustained equipollent with the resilient casing when the tire is distended.

Another object of the invention is to provide a tire spreader operating mechanism that may be readily manipulated and quickly adjusted upon the tire.

Another object of the invention is to construct a tire inspection appliance which is simple of operation, durable of structure and economic of construction.

In the development of tire inspection machines considerable effort has been devoted to the construction of a machine in which the spreader elements are actuated by a foot treadle. This controlling mechanism however is characterized by the defect that it limits the freedom of the operator about the machine and confines his movements to a particular position in relation to the work. Another object therefore, of the present invention, is to construct an inspection appliance which is free from all mechanism that tend to impede the operator in his work and to provide a machine that may be operated in a more expeditious manner than that of the foregoing type.

Other objects more or less ancillary to the foregoing and the manner in which the various objects are obtained reside in the specific construction and aggroupment of elements peculiar to the structure as will become apparent from a more complete examination of this specification, in the claims of which there are assembled and pointed out certain combinations of parts and specific constructions indicative of the scope and spirit of the invention.

In the drawings which illustrate the preferred form of the invention:

Figure 1 is a front elevational view of a tire inspection machine constructed in accordance with this invention.

Figure 2 is a side elevational view of the same including a fragmentary sectional view of the tire casing.

Figure 3 is a detail view illustrating the position of the separating elements when the tire casing is in a distended position.

Referring to the drawings in which like symbols designate corresponding parts throughout each of the several views, the inspection supporting structure comprises a rectilinear frame 10, constructed in the instant case with stanchions 11, cross members 12, stay bolts 13, and a looped back rest 14, all of these members being rigidly connected by bolts or otherwise firmly united. The stanchions 11 are preferably constructed from angle iron strips having flanges of a suitable depth to accommodate a series of angulated grooves 15 which, as shown in Figure 1, are machined in the forward and rear flanges of the angle irons adjacent their free ends. Within aligned grooves at each side of the frame there is a shaft 16 retained against axial movement by shouldered journals formed in the body of the shafts near their terminating ends. The shafts 16 are provided with cylindrical rollers 17 having concave surfaces constructed in conformity with transverse section of a tire casing 18.

Mounted respectively upon the front and rear stanchions of the frame, below the shafts 16, there is a second pair of shafts 18 each of which support a bell crank 19. The lower arms of these bell cranks are extended inwardly towards the center of the frame and are provided at their terminating ends with convex surfaced rollers 20 which are engaged by a cam 21 mounted on a shaft 22 which is supported by the frame cross members 12. The cam 21, as best shown in Figure 1 is of spiral formation and is constructed with a slight dwell adjacent its peak which is disposed substantially 360° from the base of the spiral. The engaging surface of the cam is slightly crowned in order to maintain a line contact between the rollers and the cam and to thus minimize the frictional resistance initialed by the arcuate path of the bell crank arms during the operative movement of the cam. The outer end of the shaft 22 is provided with a crank handle 23 which in the present case is integrally formed from an extended portion of the shaft. Interjacent the frame member 12 and the crank handle 23 there is a ratchet wheel 24 affixed to the shaft 22 and cooperatively associated with a gravity fall pawl 25 which is pivotally connected to the frame member 12. The upper arm of each bell crank 19 supports a pair of oppositely extended tire spreader bars 26. These bars are secured to a yoke which is pivotally mounted upon pintles 27 supported adjacent the terminating ends of the arms. The outer free ends of the bars 26 are formed with depending fingers 28 which are disposed in reentrant alignment with the open edges of a positioned tire casing and are also formed in a suitably angulated position, in relation to the annular casing, to afford a constant, even engagement, with the portion of the tire casing being distended, throughout the separating movement of the arms.

The bell cranks 19 are formed with elongated hubs 29 which resist the lateral strains imposed upon the arms by the spreader bars 26 and assure the rigidity of the separating arm structure. The bell cranks are retained laterally by collars 30 affixed to the shafts 22 adjacent each end of the hubs 29.

In the practice of this invention a tire casing 31 is placed upon the rollers 17, these rollers having first been adjusted vertically to the proper height to facilitate the adjustment of the fingers 28 between the open beaded edges of the casing. The cam 21 is then rotated by revolving the crank 23 until the bell cranks have rocked to the position which will afford the operator full vision and free access to the inner walls of the portion of the tire thus distended. By virtue the manner in which the pressure initiated by the resilient tire casing, is imposed upon the cam, and also by the proportional length of each arm of the bell crank, the crank arm may be released at any desired point during the rotation thereof and the mechanism will be sustained in a stationary balanced position. To assure the fixed location of the arms while the tire casing is separated the ratchet mechanism 24 may be employed, this adjunct being particularly useful when it is desired to repair the inner wall of the casing.

Although the foregoing description is necessarily of a detailed character in order that the invention may be completely set forth, it is to be understood that the specific terminology is not intended to be restrictive or confining and that various rearrangements of parts and modifications of structural detail may be resorted to without departing from the scope or spirit of the invention as herein explained.

What I claim is:

1. A machine for inspecting the inner surface of a tire casing embodying a tire supporting frame structure, a pair of bell cranks pivotally mounted thereon, separating bars associated with one end of said bell cranks and a rotatable cam engageable with the other arm of said bell crank.

2. A machine for inspecting the inner surface of a tire casing embodying a tire supporting frame structure, a pair of bell cranks pivotally mounted thereon, separating bars associated with one end of said bell cranks and a rotatable spiral cam engageable with the other arm of said bell crank.

3. A machine for inspecting the inner surface of a tire casing embodying a tire supporting frame structure, a pair of bell cranks pivotally mounted thereon, separating bars associated with one end of said bell cranks, rollers mounted upon the other ends of said bell cranks, and a rotatable spiral cam engageable with the bell crank rollers.

4. A machine for inspecting the inner surface of a tire casing embodying a tire supporting frame structure, a pair of bell cranks pivotally mounted thereon, separating bars associated with one end of said bell cranks, a crank shaft rotatably mounted on said supporting structure and having a cam mounted thereon, a ratchet wheel and pawl associated with said crank shaft, and anti-friction rollers mounted on the other ends of said bell cranks and engageable with the said cam.

5. A machine for inspecting and repairing the inner surface of a tire casing embodying a frame structure having a plurality of vertically adjustable, tire supporting rollers mounted thereon, a pair of bell cranks pivotally connected to the said frame and a single rotatable member for causing the simultaneous movement of said bell cranks.

6. A machine for inspecting the inner surface of a tire casing embodying a tire supporting frame structure, a pair of bell cranks having arms of substantially equal length, pivotally mounted thereon separating bars pivotally associated with one end of said bell cranks and a rotatable cam radially disposed and engageable with the other ends of said bell crank arms.

7. A tire inspecting machine comprising a supporting frame, tire opening arms pivoted thereon and cam means engaging with adjacent ends of said arms for actuating in tire opening position, the said means being mounted for rotation about an axis vertically aligned with the adjacent ends of said arms.

8. A tire machine for inspecting and repairing the inner surface of a tire comprising a supporting frame, rollers mounted on shafts carried by said frame and vertically adjustable therewith, tire opening arms pivoted upon the said frame, cam means mounted upon a shaft disposed at right angles to said roller shafts, said cam means being engageable with adjacent ends of said arms.

9. A tire inspecting machine comprising a supporting frame, tire opening arms pivoted intermediate their ends, and movable in the same plane, convex surfaced rollers mounted upon adjacent ends of said arms, cam means comprising a convex surfaced spiral cam engageable with said rollers, and disposed about an axis which lies in a plane at right angles to the plane of movement of the said spacing arms.

In testimony whereof I hereunto affix my signature this 28th day of February, 1928.

HERBERT B. SABIN.